May 31, 1960  H. L. JOHNSON  2,939,102
SELF-ALIGNING QUICK DISCONNECT PLUG
Filed Nov. 4, 1955  3 Sheets-Sheet 1

INVENTOR:
Howard L. Johnson
His Patent Attorney

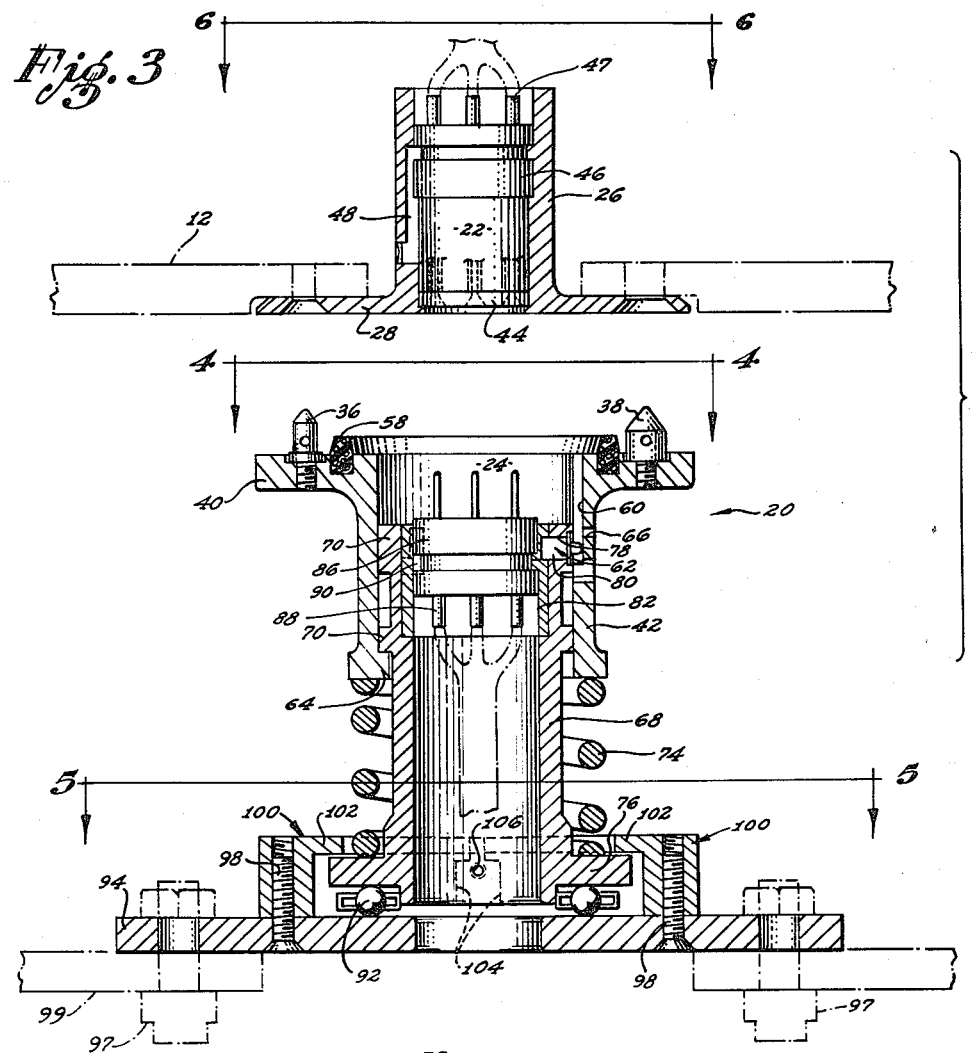
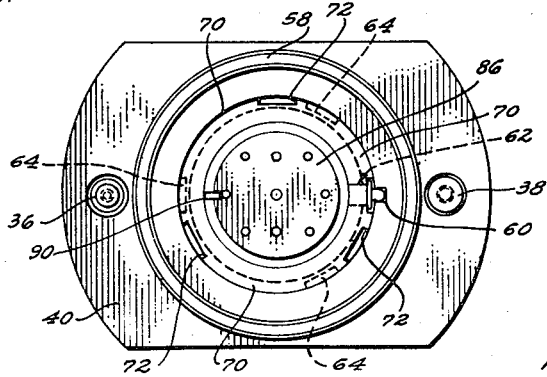

May 31, 1960  H. L. JOHNSON  2,939,102
SELF-ALIGNING QUICK DISCONNECT PLUG
Filed Nov. 4, 1955  3 Sheets-Sheet 3
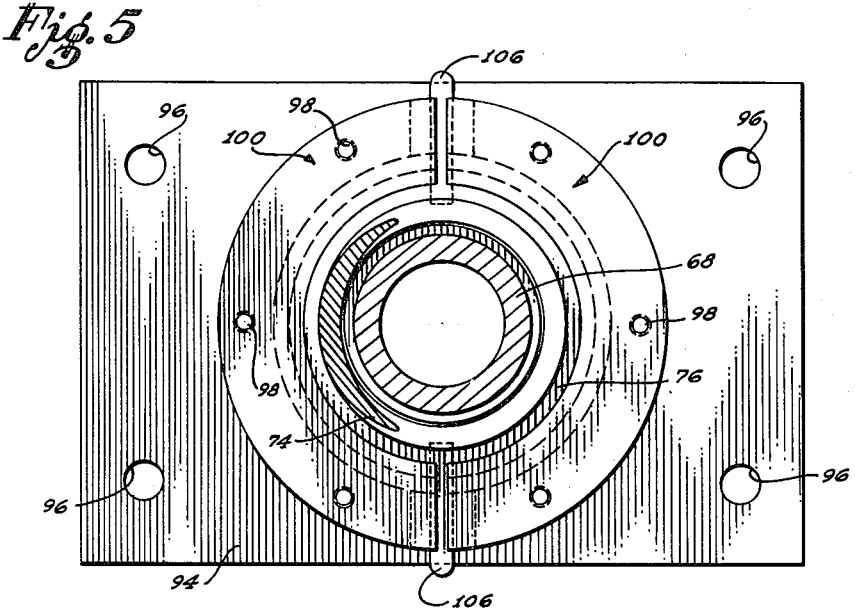
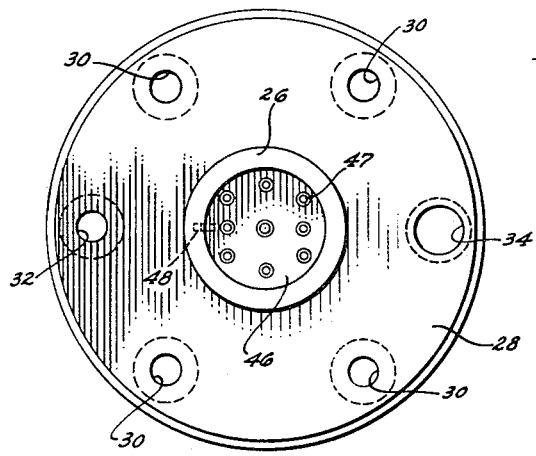
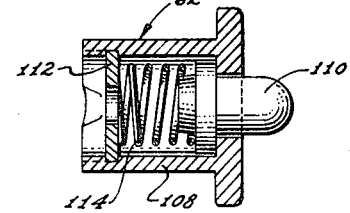
INVENTOR:
Harold L. Johnson
By Hubert E. Melcalf
His Patent Attorney United States Patent Office 2,939,102
Patented May 31, 1960

2,939,102

SELF-ALIGNING QUICK DISCONNECT PLUG

Howard L. Johnson, Gardena, Calif., assignor to Northrop Corporation, Hawthorne, Calif., a corporation of California Filed Nov. 4, 1955, Ser. No. 545,007

1 Claim. (Cl. 339—45)

This invention has to do with self-aligning, quick disconnect structure in the nature of a plug, to be used on certain types of vehicles as well as other structure.

Many of the contemporary aircraft carry, as part of the fuel system, pylon tanks. These tanks are generally used for carrying additional fuel. When the fuel in the tank has been consumed it is desirable to jettison these tanks in order to rid the aircraft of the penalty imposed. There are certain established requirements for the effective jettisoning means of pylon tanks.

The self-aligning quick disconnect plug should be as the name implies. There should be a positive contact between the parts of the separable plug and at the same time it should be capable of freely separating with the minimum amount of friction. The size and shape should be within required tolerances, and there should be no noticeable effect to the flying characteristics of the aircraft as the result of jettisoning the pylon tank.

Therefore, an object of this invention is to provide a structure that is in the nature of a self-aligning, quick disconnect plug for a pylon tank that is to be releasably attached to aircraft.

Another object of this invention is to provide a self aligning, quick disconnect plug that has established a positive contact between the separable parts and at the same time is readily separable.

A further object of this invention is to provide a self-aligning, quick disconnect plug, that, when the separable parts are made to separate, transmits little or no effect to the aircraft or surrounding structure.

Broadly stated the invention comprises a female body having beveled openings therein to receive the tapered pins of a male body. The openings and pins are for aligning the two bodies. The female is attached to the aircraft and the male body is attached to the pylon tank. The male body is spring loaded for quick release or separation from the female body, and structure is provided for holding the two bodies together as well as for initiating the separation of the pylon tank from the aircraft.

As stated before, the pylon tank may be used to carry an extra supply of fuel. On the other hand the tanks may be used for baggage, cargo or function as floats.

Figure 3 is a cross-sectional view illustrating the two major parts of this invention in a separated condition.

Figure 4 is a cross-sectional view taken on line 4—4 of Figure 3 looking in the direction indicated.

Figure 5 is a cross-sectional view taken on line 5—5 of Figure 3 looking in the direction indicated.

Figure 6 is a view of the female body of the self-aligning, quick disconnect plug taken on line 6—6 of Figure 3.

Figure 7 is a cross-sectional view of the bullet used to align two component parts of the male body.

Figure 1:
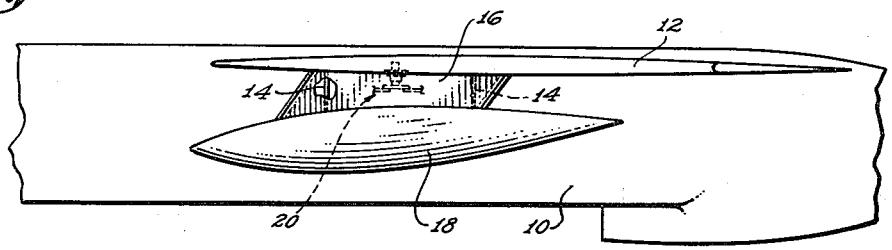
Figure 1 is a fragmentary view illustrating schematically the location and general method of attaching a pylon tank to aircraft structure through the medium of a self-aligning, quick disconnect plug.
Figure 2:
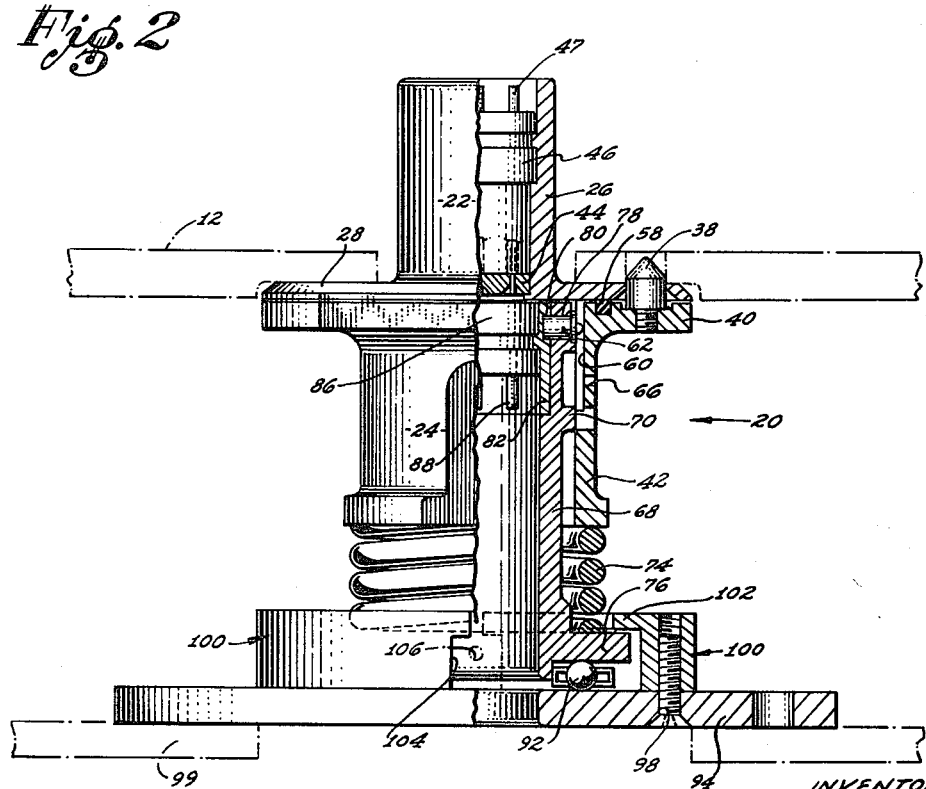
Figure 2 is a fragmentary cross-sectional view illustrating the two major parts of the invention in the connected condition.

Referring to the drawings for a more detiled description of the present invention, 10 designates a fuselage of an aircraft having a wing 12. Releasably attached to the wing 12, by explosive bolts or fasteners 14, is a pylon 16 integral with a tank 18. Located midway between the ends of the tank 18 is the self-aligning, quick disconnect plug of this invention broadly designated 20.

The primary purpose of Figure 1 is to show the relationship of the plug 20 with respect to the tank and pylon 18 and 16. Figure 1 is to be understood as being strictly schematic. In actuality the self-aligning, quick disconnect plug is considerably smaller than the surrounding structure.

The plug 20 is comprised of two major separable sections or parts. One section may be designated the female body 22 and the other section the male body means 24.

The female body comprises a cylindrical shaped body 26 having an annular flange 28 integral therewith.

There is a plurality of uniform openings 30 in the flange 28 that receive bolts, studs or fasteners for securing the body 26 to the wing 12.

The flange 28 also has a pair of opposed openings 32 and 34. Each of the last two mentioned openings is beveled to receive tapered guide pins 36 and 38, threaded into a flange 40 that is integral with an outer cylindrical or plug guide shell 42, of the male body means 24.

The body 26 has a pin guide insert disc 44 and a female electrical socket insert 46 therein, the latter having the usual electrical terminals 47 with attached leads. The electrical socket 46 is retained in the proper aligned position by an L-shaped key 48 that seats in a key way, in the body 26, of complementary configuration.

The outer or plug guide shell 42, as before stated, has a flange 40 integral therewith. There is an annular groove formed in the flange that receives a resilient seal ring 58. Formed in the body 42 is a groove 60 that receives the tip of a spring loaded bullet broadly designated 62. Integral with the body 42 and in opposed relation to flange 40 are a plurality of projections 64. Also formed in the body 42 is an opening 66 that is in communication with the groove 60 and is adapted to receive an instrument for compressing the bullet 62 in order to rotate and remove body 42 from the main shell; the latter to be hereinafter described in greater detail.

The outer shell 42 is telescoped over a portion of a cylindrical main shell 68. There are a plurality of projections 70, on the main shell, that separate notches 72 one from the other. The notches 72 receive projections 64 of the outer shell 42, and the outer shell is then retained on the main shell by rotating the shell 42 and projections 64 out of register with the notches 72.

A coiled compression spring 74 circumscribes the main shell 68 and bears against the outer shell 42 and an annular flange 76 integral with the main shell.

The main shell 68 also has an opening 78 that receives a portion of the bullet 62, and an opening 80 in an inner shell 82 communicates with the opening 78. The purpose of the bullet 62, being in an opening in the outer shell 42, main shell 68 and inner shell 82, is to index the shells with respect to the other.

Pressed into the main shell 68 is the cylindrical inner shell 82.

Located in the inner shell 82 is a male pin insert 86, having electrical terminals 88 therein, that is retained in place in the inner shell by an L-shaped key 90.

The main shell 68 rotates and horizontally slides on a thrust bearing 92 and the latter is retained in the proper position by a base plate 94. There are a plurality of openings 96, in the base 94, through which extend fasteners 97 in the nature of bolts or studs. The fasteners are for interconnecting the male body means to a bracket 99 that is in turn attached to the pylon 16.

Mounted on the base plate 94, by fasteners 98, are a pair of semi-circular, L-shaped hold down rings 100. One leg 102 of each ring assures that the main shell 68 maintains its proper position on the base plate 94, but does not restrict the rotation or horizontal movement of the main, inner and outer shell 68, 82 and 42 respectively.

Each ring has at each end a notch 104. Projecting out from the main shell 68 to which they are secured, are a pair of opposed stop pins 106. These pins engage the walls defining the notches and restrict the rotation of the aforereferred to rotatable structure.

The bullet 62, seen in cross-section in Figure 7, comprises a bullet case 108, a head 110 retained in the case in the manner illustrated, a washer 112, and a spring 114 that bears against the washer and the head to urge the latter to the extended position illustrated in Figures 2, 3, 4 and 7.

The main shell 68, outer shell 42, inner shell 82 along with related structure may be defined as the "male body." The base plate 94 along with the rings 100 may be defined as the "means" in the term "male body means."

The operation of the invention is as follows: Assume the female body 22 to be attached to the wing 12 in the manner illustrated in Figure 1 and the male body means 20 to be interconnected to the pylon and tank 16 and 18 respectively. The structure just referred to is in the general condition illustrated in Figure 3.

The pylon 16 and tank 18 are lifted until the aligning taper pins 36 and 38 engage the beveled edges of openings 32 and 34. If there is a slight misalignment, the taper pins are caused to align themselves with respect to the openings 32 and 34. As a result the outer shell 42 and main shell 68 are caused to rotate and/or move horizontally on thrust bearing 92 resulting in the female body 22 and male body means 24 coming into alignment or register. Once this is accomplished, the male pin insert 86 is aligned with the openings in the female socket insert 46. In this condition the male body means 24 may be urged into engagement with the female body 22 in the manner illustrated in Figure 2.

When the female body 22 and male body means 24 are in positive engagement, the explosive bolts or fasteners 14 are made to secure the pylon 16 and tank 18 to wing 12. The result is that the self-aligning, quick disconnect plug 20 is retained in the position illustrated in Figure 2.

When the tank 18 is empty or it is desirable to jettison the same, the bolts or studs 14 are caused to explode resulting a breaking the connection between the tank 18 and wing 12.

As soon as the fasteners 14 are exploded the female body 22 and male body means 24 are free to separate. The compression spring 74 bearing against flange 76 of the main shell 68 expands, causing separation. The male pin insert 86 separates, at the same time, from the female socket insert and the pylon 16 and tank 18 jettison from the aircraft.

It is to be understood that the explosive bolts 14 are only one way of retaining and detaching the self-aligning plug. Cables and other equally applicable structure may also be used.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

A self-aligning, quick disconnect connector comprising a female body to be attached to structure; said body having at least a pair of openings therein of different diameter; a plug rotatively adjustable relative to the structure to which it is to be attached; said plug including telescoping main and outer shells; insulated electrical contact means on said female body and plug and in cooperating relationship; a pair of pins of different diameter on said outer shell that engage and enter the corresponding openings in the female body; a base plate to be attached to a second structure; a bearing on said base plate that is in contacting relationship with said main shell; means on said plate that engages said main shell to retain the latter on the plate; and spring means on said main shell urging said outer shell toward said female body.

References Cited in the file of this patent

UNITED STATES PATENTS

| | | |
|---|---|---|
| 2,409,650 | Wiggins | Oct. 22, 1946 |
| 2,502,307 | Bascom | Mar. 28, 1950 |
| 2,658,182 | Jackson | Nov. 3, 1953 |
| 2,688,734 | Welling | Sept. 7, 1954 |
| 2,700,141 | Jones | Jan. 18, 1955 |
| 2,710,384 | Dupre | June 7, 1955 |
| 2,735,993 | Humphrey | Feb. 21, 1956 |